US005781102A

United States Patent [19]

Huang

[11] Patent Number: 5,781,102

[45] Date of Patent: Jul. 14, 1998

[54] SECURITY ALARM SYSTEM

[76] Inventor: Dennis Huang, 5F, No. 10, La. 9, Ningpo E. St., Taipei, Taiwan

[21] Appl. No.: 792,213

[22] Filed: Jan. 31, 1997

[51] Int. Cl.[6] ........ B60R 25/10

[52] U.S. Cl. ........ 340/426; 340/425.5; 340/539; 307/10.2

[58] Field of Search ........ 340/426, 425.5, 340/447, 427, 539; 379/39–51, 58, 59; 180/287; 307/10.2

[56] References Cited

U.S. PATENT DOCUMENTS 5,469,151 11/1995 Lavelle et al. ........ 340/426
5,563,453 10/1996 Nyfelt ........ 340/426

*Primary Examiner*—Jeffery Hofsass
*Assistant Examiner*—Sihong Huang
*Attorney, Agent, or Firm*—Bacon & Thomas

[57] ABSTRACT

A security alarm system including at least one code signal generator, at least one code signal receiver, a transmitter, and at least one alarm, the at least one code signal generator and the at least one code signal receiver being respectively mounted on the transmitter and the at least one alarm, the code signal generator providing a switch signal and a switch code to the at least one code signal receiver, causing each code signal receiver to alert or disarm the respective alarm subject to the instruction of the switch signal, the at least one alarm being triggered to buzz when receiving no signal from the at least one code signal receiver after a predetermined length of time.

11 Claims, 3 Drawing Sheets

SECURITY ALARM SYSTEM

BACKGROUND OF THE INVENTION

The present invention relates to security alarm systems, and more particularly to such a security alarm system adapted for preventing the products of the user from being stolen by thieves.

Regular security alarm systems are commonly comprised of a transmitter and an alarm. When a security alarm system of this type is installed, the transmitter is carried by the user, and the alarm is installed in the object to be protected for example a car. When the alarm (the car) is moved away from the transmitter (the user) over a predetermined safety distance, the alarm is immediately triggered to alarm. This structure of security alarm system is somewhat function, however it still has a drawback. Because the alarm control switch of the alarm is installed in the body of the alarm itself, the thief can directly turned off the alarm control switch of the alarm. Therefore, the alarm does not buzz when the user's property has been stolen and moved out of the set safety distance.

SUMMARY OF THE INVENTION

The present invention has been accomplished to provide a security alarm system which eliminates the aforesaid drawback. This object is achieved by controlling the arming and disarming of the alarm by a radio code signal.

According to one embodiment of the present invention, the security alarm system is comprised of at least one code signal generator, at least one code signal receiver, a transmitter, and at least one alarm. The transmitter can be carried by the user. The alarm(s) can be installed in the user's properties. Each alarm has a buzzer, but does not have an alert control switch or power switch. When a user want to alert or disarm the security alarm system, he or she uses the code signal generator to transmit a set switch signal and switch code to the code signal receiver. The security alarm system will be enable or disable if the the code signal is correct and is accepted by the code signal receiver. When the at least one alarm is respectively alerted, the transmitter continuously sends a radio code signal to the at least one alarm at a predetermined time interval. When the distance between the transmitter and one alarm surpasses a predetermined safety range, the alarm can not receive signals from the transmitter, and is immediately triggered to buzz.

DETAILED DESCRIPTION OF THE PREFERRED EMBODIMENT

Figure 1:
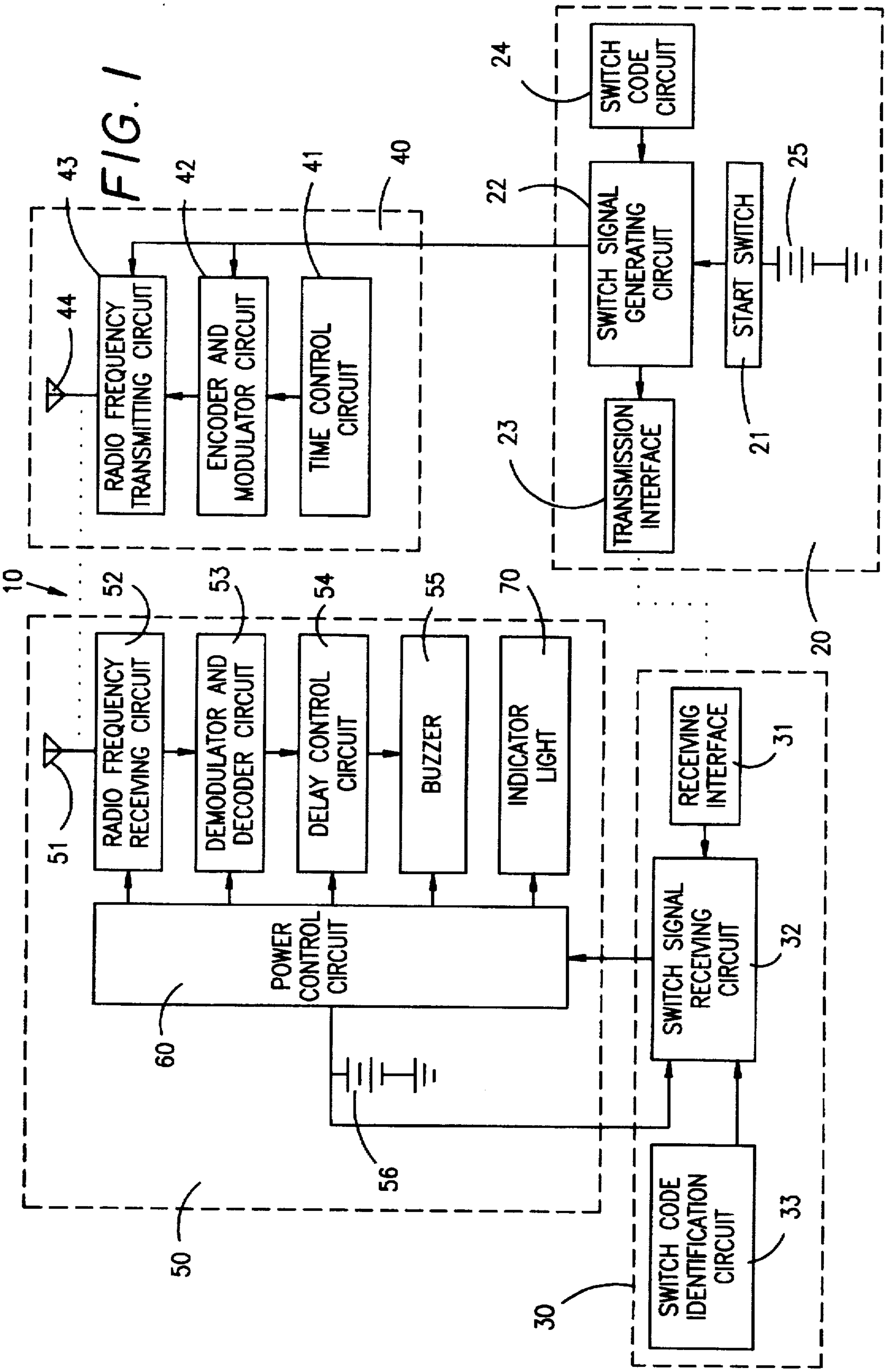
FIG. 1 is a system block diagram of a security alarm system according to the present invention.
Figure 2:
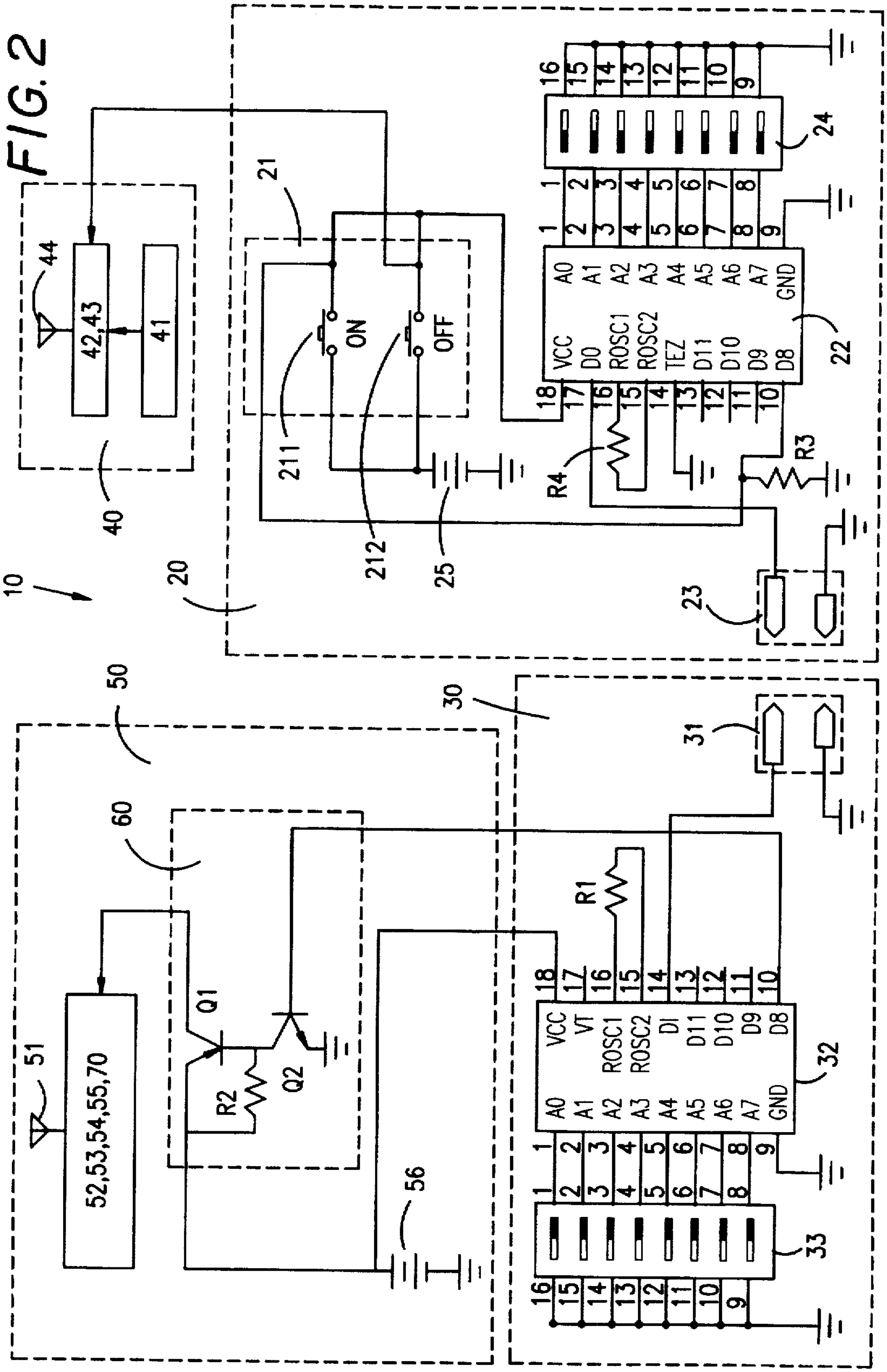
FIG. 2 is a circuit diagram according to the present invention.

Referring to FIGS. 1 and 2, a security alarm system in accordance with the present invention is generally comprised of a code signal generator 20, a code signal receiver 30, a transmitter 40, and an alarm 50.

The code signal generator 20 comprises a start switch 21, a switch signal generating circuit 22, a transmission interface 23, and a switch code circuit 24. The code signal generator 20 is mounted on the transmitter 40. The start switch 21 comprises an on switch 211 and an off switch 212 controlled to produce an on signal and an off signal respectively, permitting the signals to be transmitted to the switch signal generating circuit 22. A SW DIP-8 (a wildly used component) can be used as the switch code circuit 24, which inputs a switch code into the switch signal generating circuit 22 (see FIG. 2). The switch signal generating circuit 22 is for example a HT-12E from Holtek Semiconductors (Taiwan), that transmits the switch signal from the start switch 21 and the switch code from the switch code circuit 24 to the transmission interface 23 (see FIG. 2).

The transmitter 40 comprises a time control circuit 41, an encoder and modulator circuit 42, a radio frequency transmitter circuit 43, and a transmitting antenna 44. The operation of the transmitter 40 is outlined hereinafter. The encoder and modulator circuit 42 has a code signal set therein. It can be controlled to encode and modulate the code signal, and then to send the modulated signal to the radio frequency transmitting circuit 43 for processing into a high frequency signal, permitting the high frequency signal to be further sent into the air through the transmitting antenna 44. The process of encoding and demodulating the code signal and the process of transmitting the high frequency signal can easily be achieved by conventional techniques, therefore they are not described in detail. The time control circuit 41 is set to control the time of signal transmission from the encoder and modulator circuit 42 to the radio frequency transmitting circuit 43, i.e., to control the encoder and modulator circuit 42 to send a signal to the alarm 50 once per each for example 0.8 second.

The code signal receiver 30 is mounted on the alarm 50, comprised of a receiving interface 31, a switch signal receiving circuit 32, and a switch code identification circuit 33.

The alarm 50 comprises a receiving antenna 51, a radio frequency receiving circuit 52, a demodulator and decoder circuit 53, a delay control circuit 54, a buzzer 55, and a power control circuit 60.

Figure 3:
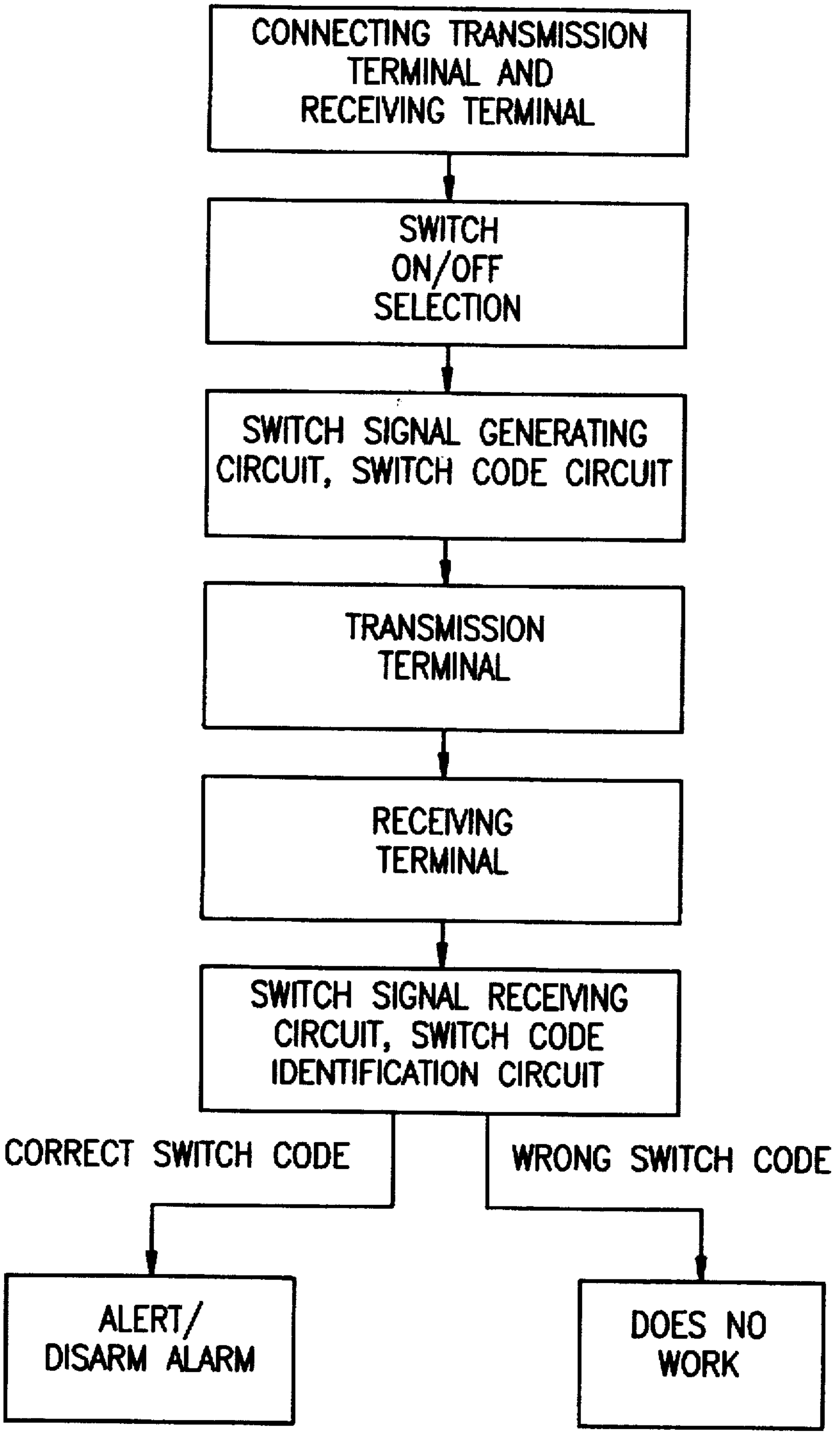
FIG. 3 is an operation flow chart according to the present invention.

Referring to FIG. 3 and FIGS. 1 and 2 again, the receiving interface 31 is connected to the transmission interface 23 by fastening a respective terminal to each other, and adapted to receive the switch signal and the switch code from the transmission interface 23 and then to transmit the switch signal and the switch code to the switch signal receiving circuit 32 and the switch code identification circuit 33 respectively. The switch signal receiving circuit 32 and the switch code identification circuit 33 identify the switch signal and the switch code transmitted from the receiving interface 31 by comparing them with the set switch signal and switch code. When the received switch signal and switch code are identified, the switch signal is transmitted to the power control circuit 60, causing it to be turned on/off.

The power control circuit 60 is comprised of a PNP transistor Q1, a NPN transistor Q2 and a resistor R2, and adapted for controlling the transmission of power supply to the radio frequency receiving circuit 52, the demodulator and decoder circuit 53, the delay control circuit 54 and the buzzer 55.

The operation of the alarm 50 is outlined hereinafter. The receiving antenna 51 receives the code signal transmitted from the transmitting antenna 44, and then transmits the received code signal to the demodulator and decoder circuit 53 through the radio frequency receiving circuit 52. The demodulator and decoder circuit 53 demodulates the high frequency signal from the radio frequency receiving circuit 52 into a low frequency signal, then decodes the signal, and then compares the decoded signal with the set code signal. When the decoded signal is identified in conformity with the set code signal, the decoded signal is then transmitted to the delay control circuit 54. Because the radio frequency receiving circuit 52, the demodulator and decoder circuit 53 and the delay control circuit 54 are of the known art, they are not described in detail. The delay control circuit 54 is adapted for setting a delay time, for example, two seconds. If the delay control circuit 54 receives no signal from the demodulator and decoder circuit 53 after the set delay time is up, it immediately drives the buzzer 55 to buzz.

Further, an indicator light 70 for example a light emitting diode is installed in the power control circuit 60, and synchronously operated with the status of the power control circuit 60, i.e., the indicator light 70 is off when the power control circuit 60 is turned off; the indicator light 70 is on when the power control circuit 60 is turned on.

As indicated above, a thief cannot directly turn off power supply from the alarm, because the power switch of the security alarm system is not installed in the alarm; the alarm of the security alarm system can be alerted or disarmed only when the signal from the code signal generator is received and identified by the code signal receiver. Further, the transmitter can be set to control a plurality of alarms; the code signal set in the encoder and modulator circuit can be provided by another circuit, or replaced by the switch code from the switch code circuit .

While only one embodiment of the present invention has been shown and described, it will be understood that various modifications and changes could be made thereunto without departing from the spirit and scope of the invention disclosed. For example, the code signal generator may be installed in the alarm and the code signal receiver installed in the transmitter; the code signal generator and the code signal receiver are independently installed and separated from the transmitter and the alarm.

What the invention claimed is:

1. A security alarm system comprising:

i) at least one code signal generator, said code signal generator comprising a start switch, a switch signal generating circuit, a transmission interface, and a switch code circuit, said start switch comprising an ON switch and an OFF switch controlled to produce an ON signal and an OFF signal respectively, and to send the signals to said switch signal generating circuit, said switch code circuit being controlled to input a switch code into said switch signal generating circuit, said switch signal generating circuit being controlled to transmit a switch signal from said start switch and the switch code from said switch code circuit to said transmission interface;

ii) at least one code signal receiver, each of said at least one code signal receiver comprising a receiving interface, a switch signal receiving circuit, and a switch code identification circuit, said receiving interface receiving the switch signal and the switch code from said transmission interface, and then transmitting the signals to said switch signal receiving circuit and said switch code identification circuit respectively, said switch signal receiving circuit and said switch code identification circuit comparing and identifying the switch signal and the switch code transmitted from said receiving interface, and controlling the operation of a power control circuit subject to the instruction of the switch signal;

(iii) a transmitter, said transmitter comprising an encoder and modulator circuit, a radio frequency transmitter circuit, and a transmitting antenna, said encoder and modulator circuit being controlled to encode and modulate a set of code signal, and then to send the modulated signal to said radio frequency transmitting circuit, said radio frequency transmitting circuit processing the modulated signal from said encoder and modulator circuit into a high frequency signal, permitting the high frequency signal to be driven out of said transmitting antenna; and (iv) at least one alarm, each of said at least one alarm comprising a receiving antenna, a radio frequency receiving circuit, a demodulator and decoder circuit, a delay control circuit, a buzzer, and said power control circuit, said power control circuit being controlled by said switch signal receiving circuit to provide the necessary working power supply to said alarm, said receiving antenna receiving the signal transmitted from said transmitting antenna and then sending the received signal to said radio frequency receiving circuit, said radio frequency receiving circuit receiving the signal from said receiving antenna and then sending the receiving signal to said demodulator and decoder circuit, said demodulator and decoder circuit demodulating and identifying the signal received from said radio frequency receiving circuit and then sending the signal to said delay control circuit, said delay control circuit driving said buzzer to buzz when receiving no signal from said demodulator and decoder circuit after a predetermined length of time.

2. The security alarm system of claim 1 wherein said at least one code signal generator is respectively installed in said transmitter, and said at least one code signal receiver is respectively installed in said at least one alarm.

3. The security alarm system of claim 1 wherein said at least one code signal generator is respectively installed in said at least one alarm, and said at least one code signal receiver is respectively installed in said transmitter.

4. The security alarm system of claim 2 wherein the number of said at least one code signal receiver is equal to that of said at least one alarm.

5. The security alarm system of claim 3 wherein the number of said at least one code signal generator is equal to that of said at least one alarm.

6. The security alarm system of claim 1 wherein said power control circuit further comprises an indicator light synchronously turned on/off with said power control circuit.

7. The security alarm system of claim 6, wherein said indicator light is a light emitting diode.

8. The security alarm system of claim 1 wherein said transmission interface comprises a terminal, and said receiving interface comprises a terminal connected to the terminal of said transmission interface for signal transmission.

9. The security alarm system of claim 1 wherein said transmitter further comprises a time control circuit set to control said encoder and modulator circuit to send a signal to said at least one alarm at a predetermined time interval.

10. The security alarm system of claim 1 wherein said at least one code signal generator is respectively separated from said transmitter and said at least one alarm.

11. The security alarm system of claim 1 wherein said at least one code signal receiver is respectively separated from said transmitter and said at least one alarm.

* * * * *